(12) United States Patent
Benjebbour et al.

(10) Patent No.: US 8,891,656 B2
(45) Date of Patent: Nov. 18, 2014

(54) LOW-COMPLEXITY, RANK EXTENDABLE, CODEBOOK DESIGN AND METHOD FOR SUPPORTING PRECODING MATRIX FEEDBACK FOR MULTI-USER AND SINGLE-USER MIMO SYSTEMS

(75) Inventors: Anass Benjebbour, Tokyo (JP); Sean A. Ramprashad, Los Altos, CA (US)

(73) Assignee: NTT DoCoMo, Inc., Tokyo (JP)

( * ) Notice: Subject to any disclaimer, the term of this patent is extended or adjusted under 35 U.S.C. 154(b) by 35 days.

(21) Appl. No.: 13/555,973

(22) Filed: Jul. 23, 2012

(65) Prior Publication Data
US 2013/0107915 A1   May 2, 2013

Related U.S. Application Data

(60) Provisional application No. 61/552,273, filed on Oct. 27, 2011.

(51) Int. Cl.
*H04L 1/02* (2006.01)
*H04B 7/04* (2006.01)
*H04L 25/03* (2006.01)
(52) U.S. Cl.
CPC .............. *H04B 7/0469* (2013.01); *H04B 7/0486* (2013.01); *H04L 25/03898* (2013.01)
USPC ........................................ 375/267

(58) Field of Classification Search
USPC ......... 375/267, 130, 295, 340, 345, 347, 349; 370/328, 329; 455/67.11, 101, 132
See application file for complete search history.

(56) References Cited

U.S. PATENT DOCUMENTS

| 2008/0205533 | A1* | 8/2008 | Lee et al. ........................ | 375/260 |
| 2012/0069917 | A1* | 3/2012 | Liu et al. ........................ | 375/259 |
| 2013/0039319 | A1* | 2/2013 | Shi et al. ........................ | 370/329 |

* cited by examiner

*Primary Examiner* — Khai Tran
(74) *Attorney, Agent, or Firm* — Osha Liang LLP

(57) ABSTRACT

A wireless communication method includes a mobile terminal for supporting precoding matrix feedback for multi-user and single-user multiple-input and multiple-output (MIMO) systems. The wireless communication method also includes obtaining, at the mobile terminal, channel state information comprising at least gain information and relative-phase information. Further, the method includes generating precoding matrices comprising $b_g$, p1, p2, and p3 bit groups, wherein each of the precoding matrices are generated by quantization using at least the gain information and the relative-phase information between antenna elements. The method also includes selecting the best precoding matrix among the generated precoding matrices, and transmitting the bit sequence representing the selected precoding matrix to a base station.

19 Claims, 16 Drawing Sheets

Flowchart of an embodiment of the quantization process using an adaptive bit-allocation to phase components Flow Chart of one embodiment of the quantization process Flowchart of an embodiment of the quantization process using an adaptive bit-allocation to phase components

Figure 3

| Index | Permutation "T" | Gain Vector |
|---|---|---|
| 0 | {1,3,2,4} | $\mathbf{g} = \left\{ \sqrt{\dfrac{a}{3+a}}, \sqrt{\dfrac{1}{3+a}}, \sqrt{\dfrac{1}{3+a}}, \sqrt{\dfrac{1}{3+a}} \right\}$ where $a = 10^{2\alpha/10}$ |
| 1 | {2,4,,1,3} | |
| 2 | {3,1,2,4} | |
| 3 | {4,2,1,3} | |

Table 1. An embodiment of a 2-bit joint gain and permutation codebook

Figure 4

| Index | Permutation "T" | Gain Vector |
|---|---|---|
| 0 | {1,2,3,4} | G={1/2, 1/2, 1/2, 1/2} |
| 1 | {1,2,3,4} | $\mathbf{g} = \left\{ \sqrt{\dfrac{b}{2+2b}}, \sqrt{\dfrac{b}{2+2b}}, \sqrt{\dfrac{1}{2+2b}}, \sqrt{\dfrac{1}{2+2b}} \right\}$ where $b = 10^{2\beta/10}$ |
| 2 | {1,3,2,4} | |
| 3 | {1,4,2,3} | |
| 4 | {2,3,1,4} | |
| 5 | {2,4,1,3} | |
| 6 | {3,4,1,2} | |
| 7 | None | |

Table 2. An embodiment of a 3-bit joint gain and permutation codebook

Figure 5

| Index | Permutation "I" | Gain Vector |
|---|---|---|
| 0 | {1,3,2,4} | $\mathbf{g} = \left\{ \sqrt{\dfrac{c}{3+c}},\ \sqrt{\dfrac{1}{3+c}},\ \sqrt{\dfrac{1}{3+c}},\ \sqrt{\dfrac{1}{3+c}} \right\}$ where $c = 10^{2\kappa/10}$ |
| 1 | {2,4,1,3} | |
| 2 | {3,1,2,4} | |
| 3 | {4,1,2,3} | |
| 4 | {1,2,3,4} | $\mathbf{g} = \left\{ \sqrt{\dfrac{d}{2+2d}},\ \sqrt{\dfrac{d}{2+2d}},\ \sqrt{\dfrac{1}{2+2d}},\ \sqrt{\dfrac{1}{2+2d}} \right\}$ where $d = 10^{2\rho/10}$ |
| 5 | {1,3,2,4} | |
| 6 | {1,4,2,3} | |
| 7 | {2,3,1,4} | |
| 8 | {2,4,1,3} | |
| 9 | {3,4,1,2} | |
| 10 | {1,2,3,4} | $\mathbf{g} = \left\{ \sqrt{\dfrac{t}{2+2t}},\ \sqrt{\dfrac{t}{2+2t}},\ \sqrt{\dfrac{1}{2+2t}},\ \sqrt{\dfrac{1}{2+2t}} \right\}$ where $t = 10^{2\tau/10}$ |
| 11 | {1,3,2,4} | |
| 12 | {1,4,2,3} | |
| 13 | {2,3,1,4} | |
| 14 | {2,4,1,3} | |
| 15 | {3,4,1,2} | |

Table 3. An embodiment of a 4-bit joint gain and permutation codebook

Figure 6

| Index | Permutation "I" | Bit-Allocation {p1,p2,p3} | Gain Vector |
|---|---|---|---|
| 0 | {1,3,2,4} | {6,5,5} | $\mathbf{g} = \left\{ \sqrt{\dfrac{c}{3+c}}, \sqrt{\dfrac{1}{3+c}}, \sqrt{\dfrac{1}{3+c}}, \sqrt{\dfrac{1}{3+c}} \right\}$ where $c = 10^{2\kappa/10}$ |
| 1 | {2,4,1,3} | | |
| 2 | {3,1,2,4} | | |
| 3 | {4,1,2,3} | | |
| 4 | {1,2,3,4} | {7,4,5} | $\mathbf{g} = \left\{ \sqrt{\dfrac{d}{2+2d}}, \sqrt{\dfrac{d}{2+2d}}, \sqrt{\dfrac{1}{2+2d}}, \sqrt{\dfrac{1}{2+2d}} \right\}$ where $d = 10^{2\kappa/10}$ |
| 5 | {1,3,2,4} | | |
| 6 | {1,4,2,3} | | |
| 7 | {2,3,1,4} | | |
| 8 | {2,4,1,3} | | |
| 9 | {3,4,1,2} | | |

Figure 7A

| Step | Operation | Complexity |
|---|---|---|
| 1 | Select the gain and permutation.<br><br>Let $q=\{q(1), q(2), q(3), q(4)\}^T$<br><br>Define $h=\{|q(1)|, |q(2)|, |q(3)|, |q(4)|\}^T$<br><br>$=\{h(1), h(2), h(3), h(4)\}^T$<br><br>The goal is to select the permutation $I=\{i(1),i(2),i(3),i(4)\}$ and gain vector $g=\{g(1),g(2),g(3),g(4)\}$ to maximize<br><br>$$\text{gaininnerp} = \sum_{k=1}^{4} g(k)h(i(k))$$<br><br>The structure allows this to be done with few multiplications.<br><br>Specifically:<br><br>A) 2-bit codebook: Select the antenna with the largest gain. If $k^*$ is the antenna element, then select the permutation with $i(1)=k^*$.<br><br>B) 3-bit codebook: Select the two antennas with the largest gain. If these antennas are $[k^*,j^*]$ then consider the permutation with an unequal gain vector with $i(1)=k^*$ and $i(2)=j^*$. Calculate "gaininnerp" for both this permuation/gain combination and for the equal gain vector. Choose the best.<br><br>C) 4-bit codebook: Natural extension of principles described above for 2-bit and 3-bit searchers<br><br>Call this best permutation-gain index $g^*$<br><br>Note, this index specifies both the selected permutation $I=\{i(1),i(2),i(3),i(4)\}$ and the selected gain vector $g=\{g(1),g(2),g(3),g(4)\}$ | i. 4 abs() operations and 4 compare operations<br><br>ii. Additionally, for the 3-bit codebook no more than 4 multiplications and 6 additions<br><br>iii. Additionally, for the 3-bit codebook no more than 8 multiplications and 9 additions<br><br>Note. since come gain values are the same for some cases, e.g. $g(1)=g(2)$, $g(3)=g(4)$, multiplications in the sum can be combined in some cases |
| 2 | Divide the target into two subvectors<br><br>$q1=\{q(i(1)), q(i(2))\}$<br><br>$q2=\{q(i(3)), q(i(4))\}$ | |

Figure 7B

| | 3 | Select intra-phase for q1.<br><br>For cases where g(1)=g(2), the optimal index is defined by<br><br>$$n^* = \text{argmax}_{n=0,1,\ldots,P_1-1} |\phi_{1,n}^H \mathbf{q1}|$$<br><br>The optimal vector is defined by $\phi_{1,n^*}$.<br><br>For cases, where g(1) is not equal to g(2), the optimal index is defined by<br><br>$$n^* = \text{argmax}_{n=0,1,\ldots,P_1-1} |\phi_{1,n}^H \mathbf{r1}| \text{ where } \mathbf{r1} = \begin{bmatrix} g(1)q(i(1)) \\ g(2)q(i(2)) \end{bmatrix}$$ | i. No more than $2+2^{\{p_1\}}$ multiplications<br><br>ii. No more than $2^{\{p_1\}}$ additions |
|---|---|---|---|
| | 3 | Select intra-phase for q2.<br><br>For cases where g(3)=g(4), the optimal index is defined by<br><br>$$m^* = \text{argmax}_{m=0,1,\ldots,P_2-1} |\phi_{2,m}^H \mathbf{q2}|$$<br><br>The optimal vector is defined by $\phi_{2,m^*}$.<br><br>For cases, where g(3) is not equal to g(4), the optimal index is defined by<br><br>$$m^* = \text{argmax}_{m=0,1,\ldots,P_2-1} |\phi_{2,m}^H \mathbf{r2}| \text{ where } \mathbf{r2} = \begin{bmatrix} g(3)q(i(3)) \\ g(4)q(i(4)) \end{bmatrix}$$ | i. No more than $2+2^{\{p_2\}}$ multiplications<br><br>ii. No more than $2^{\{p_2\}}$ additions |

Figure 7C

| | | | |
|---|---|---|---|
| | 4 | Select the inter-subvector phase between q1 and q2 given the intra-subvector phase selections.<br><br>Define<br><br>$$\rho_1 = \phi_{1,n^*}^H \begin{bmatrix} g(1)q(i(1)) \\ g(2)q(i(2)) \end{bmatrix} \text{ and } \rho_2 = \phi_{2,m^*}^H \begin{bmatrix} g(3)q(i(3)) \\ g(4)q(i(4)) \end{bmatrix}$$<br><br>Then the inter-subvector phase index is defined by<br><br>$$r^* = \arg\max_{r=0,1,\ldots,P_3-1} |\rho_1 + \omega_r \rho_2|$$<br><br>The optimal inter-subvector phase is defined by $\omega_{r^*}$ | i. No more than $4+2^{\{p_3\}}$ multiplications<br><br>ii. No more than $2+2^{\{p_3\}}$ additions |
| | 5 | Send to the base station the $b_g$, $p_1$, $p_2$, and $p_3$ bits defining indices $g^*$, $n^*$, $m^*$ and $r^*$ | |
| | 6 | At the base station form the rank-1 vector<br><br>$$\mathbf{v} = \begin{bmatrix} w(i(1)) \\ w(i(2)) \\ w(i(3)) \\ w(i(4)) \end{bmatrix}$$<br><br>where<br><br>$$\mathbf{w} = \begin{bmatrix} w(1) \\ w(2) \\ w(3) \\ w(4) \end{bmatrix} = \begin{bmatrix} \begin{bmatrix} g(1) \\ g(2)e^{j2\pi(n^*)/P_1} \end{bmatrix} \\ e^{j2\pi(r^*)/P_3} \begin{bmatrix} g(3) \\ g(4)e^{j2\pi(m^*)/P_2} \end{bmatrix} \end{bmatrix}$$<br><br>and where the gain and permutations<br>$\mathbf{g} = \{g^*(1) \; g(2) \; g(3) \; g(4)\}$ and $\{i(1), i(2), i(3), i(4)\}$<br>are specified by the index $g^*$ | |

Table 1. Flow-chart of rank-1 PMI low-complexity search based on matching to a single 4x1 target vector using the proposed codebook structure.

Figure 8A

| Step | Operation | Complexity |
|---|---|---|
| 1A | Select the gain and permutation.<br><br>Let $q=\{q(1), q(2), q(3), q(4)\}^T$<br><br>Define $h=\{|q(1)|/G_{diff}, |q(2)|/G_{diff}, |q(3)|, |q(4)|\}^T$<br><br>$= \{h(1), h(2), h(3), h(4)\}^T$<br><br>The goal is to select the permutation $I=\{i(1),i(2),i(3),i(4)\}$ and gain vector $g=\{g(1),g(2),g(3),g(4)\}$ to maximize<br><br>$$\text{gaininnerp} = \sum_{k=1}^{4} g(k)h(i(k))$$<br><br>The structure allows this to be done with few multiplications.<br><br>Specifically:<br><br>D) 2-bit codebook: Select the antenna with the largest gain. If $k^*$ is the antenna element, then select the permutation with $i(1)=k^*$.<br><br>E) 3-bit codebook: Select the two antennas with the largest gain. If these antennas are $[k^*,j^*]$ then consider the permutation with an unequal gain vector with $i(1)=k^*$ and $i(2)=j^*$. Calculate "gaininnerp" for both this permutation/gain combination and for the equal gain vector. Choose the best.<br><br>F) 4-bit codebook: Natural extension of principles described above for 2-bit and 3-bit searchers<br><br>Call this best permutation-gain index $g^*$<br><br>Note, this index specifies both the selected permutation $I=\{i(1),i(2),i(3),i(4)\}$ and the selected gain vector $g=\{g(1),g(2),g(3),g(4)\}$<br><br>If $g=\{g(1),g(2),g(3),g(4)\}$ is the gain vector described by $g^*$, then define a new gain vector. | iv. 4 abs() operations and 4 compare operations, and 2 divisions.<br><br>v. Additionally, for the 3-bit codebook no more than 4 multiplications and 6 additions<br><br>vi. Additionally, for the 3-bit codebook no more than 8 multiplications and 9 additions<br><br>Note. since come gain values are the same for some cases, e.g. $g(1)=g(2)$, $g(3)=g(4)$, multiplications in the sum can be combined in some cases |

Figure 8B

| | | |
|---|---|---|
| | $\|q(4)\|\}^T$<br><br>$=\{h2(1), h2(2), h2(3), h2(4)\}^T$<br><br>Another method is simply to search over all permutations $I=\{i(1),i(2),i(3),i(4)\}$ and gain vectors $g=\{g(1),g(2), g(3),g(4)\}$ to maximize<br><br>$\text{gaininnerp } 2 = \sum_{k=1}^{4} g(k)h2(i(k))$ | |
| 1B | If $g=\{g(1),g(2),g(3),g(4)\}$ is the gain vector described by $g^*$, then define a new gain vector $g2=\{g2(1),g2(2),g2(3),g2(4)\}$ where<br><br>$g2(i)=G_{diff}\,g(i)$      if $i1(i)=1$ or 2,<br><br>$g2(i)=g(i)$      otherwise | |
| 1C | Calculate $dB_{diff}=\log(\|[g2(1),g2(2)]\|/\|[g2(3),g2(4)]\|)$<br><br>The rounded integer value of $dB_{diff}$ defines the bit-allocation to $p1$, $p2$ and $p3$. | |
| 2 | Divide the target into two subvectors<br><br>$q1=\{q(i(1)), q(i(2))\}$<br><br>$q2=\{q(i(3)), q(i(4))\}$ | |

Figure 8C

| | 3 | Select intra-phase for q1.<br><br>For cases where g2(1)=g2(2), the optimal index is defined by<br><br>$$n^* = \arg\max_{n=0,1,\ldots,P_1-1} |\phi_{1,n}^H \mathbf{q1}|$$<br><br>The optimal vector is defined by $\phi_{1,n^*}$<br><br>For cases, where g2(1) is not equal to g2(2), the optimal index is defined by<br><br>$$n^* = \arg\max_{n=0,1,\ldots,P_1-1} |\phi_{1,n}^H \mathbf{r1}| \text{ where } \mathbf{r1} = \begin{bmatrix} g2(1)q(\cdot) \\ g2(2)q(\cdot) \end{bmatrix}$$ | iii. No more than $2+2^{\{p_1\}}$ multiplications<br><br>iv. No more than $2^{\{p_1\}}$ additions |
|---|---|---|---|
| | 3 | Select intra-phase for q2.<br><br>For cases where g2(3)=g2(4), the optimal index is defined by<br><br>$$m^* = \arg\max_{m=0,1,\ldots,P_2-1} |\phi_{2,m}^H \mathbf{q2}|$$<br><br>The optimal vector is defined by $\phi_{2,m^*}$<br><br>For cases, where g2(3) is not equal to g2(4), the optimal index is defined by<br><br>$$m^* = \arg\max_{m=0,1,\ldots,P_2-1} |\phi_{2,m}^H \mathbf{r2}| \text{ where } \mathbf{r2} = \begin{bmatrix} g2( \\ g2( \end{bmatrix}$$ | iii. No more than $2+2^{\{p_2\}}$ multiplications<br><br>iv. No more than $2^{\{p_2\}}$ additions |

Figure 8D

| | | | |
|---|---|---|---|
| 4 | Select the inter-subvector phase between q1 and q2 given the intra-subvector phase selections.<br><br>Define<br><br>$$\rho_1 = \phi_{2,n}^H \cdot \begin{bmatrix} g2(1)q(i(1)) \\ g2(2)q(i(2)) \end{bmatrix} \text{ and } \rho_2 = \phi_{2,m}^H \cdot \begin{bmatrix} g2(3)q(i(3)) \\ g2(4)q(i(4)) \end{bmatrix}$$<br><br>Then the inter-subvector phase index is defined by<br><br>$$r^* = \arg\max_{r=0,1,\ldots,P_3-1} |\rho_1 + \omega_r \rho_2|$$<br><br>The optimal inter-subvector phase is defined by $\omega_{r^*}$. | iii. No more than $4!2^{\{p_3\}}$ multiplications<br>iv. No more than $2+2^{\{p_3\}}$ additions |  |
| 5 | Send to the base station the $b_g$, $p_1$, $p_2$, and $p_3$ bits defining indices $g^*$, $n^*$, $m^*$ and $r^*$ | | |
| 6 | At the base station form the rank-1 vector<br><br>$$\mathbf{v} = \begin{bmatrix} w(i(1)) \\ w(i(2)) \\ w(i(3)) \\ w(i(4)) \end{bmatrix}$$<br><br>where<br><br>$$\mathbf{w} = \begin{bmatrix} w(1) \\ w(2) \\ w(3) \\ w(4) \end{bmatrix} = \begin{bmatrix} g2(1) \\ g2(2)e^{j2\pi(n^*)/P_1} \\ e^{j2\pi(r^*)/P_3} \begin{bmatrix} g2(3) \\ g2(4)e^{j2\pi(m^*)/P_2} \end{bmatrix} \end{bmatrix}$$<br><br>and where the gain and permutations<br>$g = \{g^*(1) \; g(2) \; g(3) \; g(4)\}$ and $\{i(1), i(2), i(3), i(4)\}$<br>are specified by the index $g^*$, and<br>$g2 = \{g2^*(1) \; g2(2) \; g2(3) \; g2(4)\}$ are specified by $g$ and $G_{diff}$ | | |

Table 2. Flow of operations including a gain difference $G_{diff}$ between antennas 1&2 and antennas 3&4.

Figure 9

| $b_g$ | $\alpha$ | $\beta$ | $\Delta$ | $\tau$ | $\kappa$ | $p1$ | $p2$ | $p3$ | $\text{Log}_2()$ error performance |
|---|---|---|---|---|---|---|---|---|---|
| 0 | n/a | n/a | n/a | n/a | n/a | 4 | 4 | 4 | -2.2 |
| 2 | 3.0 | n/a | n/a | n/a | n/a | 3 | 3 | 4 | -3.4 |
| 3 | n/a | 4.0 | n/a | n/a | n/a | 4 | 2 | 3 | -3.5 |
| 4 | n/a | n/a | 5.0 | 2.5 | 5.0 | 3 | 2 | 3 | -4.0 |

Table 7. Optimal designs coming out of tests on data from an ITU-R Urban Micro Channel model with non Line of Sight Data and ½ wavelength antenna spacing.

Figure 10
Prior Art

| Rank Indicator Index | Rank indicated | Rank-n vectors |
|---|---|---|
| 0 | 1 | v |
| 1 | 2 | {v, v2} |
| 2 | 3 | {v, v2, v3} |
| 3 | 4 | {v, v2, v3, v4} |

Table 8. A method of indicating rank via a "Rank Indicator" and the associated vectors for rank 1, 2, 3, and 4. (prior art)

Figure 11

| Index | Rank-2 vector accompanying rank-1 vector v |
|---|---|
| 0 | v2 |
| 1 | v3 |
| 2 | v4 |
| 3 | None |

Table 9. A method of indicating rank 1 or rank 2, with a flexible definition of the rank 2 accompanying vector

LOW-COMPLEXITY, RANK EXTENDABLE, CODEBOOK DESIGN AND METHOD FOR SUPPORTING PRECODING MATRIX FEEDBACK FOR MULTI-USER AND SINGLE-USER MIMO SYSTEMS

CROSS-REFERENCE TO RELATED APPLICATIONS

The present application claims priority from U.S. Provisional Application No. 61/552,273, filed Oct. 27, 2011. The content of the priority application is hereby incorporated by reference in its entirety.

BACKGROUND OF INVENTION

1. Technical Field

One or more embodiments of the present invention relate to wireless communications technology. Specifically, one or more embodiments of the present invention are used to improve the performance of multi-user multiple-input, multiple-output (MU-MIMO) and single-user MIMO (SU-MIMO) systems that use a bit sequence representing the pre-coding matrix in order to represent the channel state information (CSI) of a user.

2. Background Art

Multi-user MIMO, and certain forms of Single-User MIMO, require that the transmitting entity know something about the channel state information (CSI) that exists between the transmitting antennas (e.g. at a base station) and the receiving antennas at one or more receivers (e.g. one or more mobile terminals). Multi-user MIMO (MU-MIMO), in particular, is sensitive to the accuracy in the knowledge of such CSI. Specifically, if the CSI that is assumed at the transmitter, and is used in selecting the users to be served, assigning rates to such users, and forming the beamforming vectors which carry data streams to such users, is different from the CSI that is experienced at the time and frequencies used for transmission, then high-levels of interference may be experienced between the streams of different users. This "intra" transmission interference may severely limit the rates that can be supported by MU-MIMO.

Many factors come together in determining the "accuracy" of the CSI known at the transmitter and receiver. Some of these depend on the physics of the channel, e.g. how fast the channel changes in time and/or frequency. Some depend on limits imposed by a system design, e.g. the time-delay between estimating the CSI at the receivers, feeding knowledge of such CS back to the transmitter, and ultimately using at the transmitter for directing data transmissions. Another factor is the number of bits used by a receiving entity to describe the CSI to the transmitter via digital feedback. The present release of 3GPP's LTE design uses only 4 bits to describe a rank-1 channel.

Part of the reason for using this potentially interference-limited 4-bit LTE design is that LTE has in the past placed strong emphasis on scenarios where either the CS changed rapidly in time and/or frequency, or scenarios where the channel feedback had to describe a state used over a large bandwidth (e.g. 5 to 20 MHz). In such a case channel dynamics dominated over CS feedback accuracy and MU-MIMO does not operate efficiently for such reasons rather than by feedback limitations. Another is a stronger focus on SU-MIMO which requires less accurate CS.

Even in cases with slower channel dynamics where MU-MIMO can operate efficiently, a difficulty in considering feedback in excess of 4 bits is designing large codebooks that also support rank n>1 feedback. For example, cases where a user may want to represent n=2 subspaces of the 4×2 CS. Other concerns include using a large number of CSI bits in terms of transmission resources and computational/receiver complexity.

However, such concerns are becoming less important as deployment scenarios look to lower channel dynamics such as lower mobility users and smaller cells. Furthermore, improvement in MIMO spectral efficiency for cases of multiple users ultimately rests on getting MU-MIMO to work efficiently over SU-MIMO improvements. Thus, emphasis is shifting to improving MU-MIMO, to allow for significant spectral efficiency over SU-MIMO. To do so, there is an inherent need for supporting more feedback bits in CSI.

LTE also presently supports a number of different codebook designs, including FFT and Householder transform-based designs. For operations with N transmit antennas, the designs define a number of orthonormal N×N "precoding matrices" (PMs), each selectable by a "Precoding Matrix Indicator" (PMI) which includes a bit sequence representing the selected code vector entry (precoding matrix) from the codebook. However, the LTE designs are rather constrained, where antenna elements are all given the same gain, and only small numbers of PMs are used. That is, there is no concept of a gain-vector across antennas. In addition, LTE and academic contributions have described designs using "intra-site" and "inter-site" antenna phase differences. However, such designs have not included a number of features described in this particular design and method.

SUMMARY OF INVENTION

According to one or more embodiments of the present invention, a wireless communication method in a mobile terminal for supporting precoding matrix feedback for multi-user and single-user multiple-input and multiple-output (MIMO) systems, includes obtaining, at the mobile terminal, channel state information comprising at least gain information and relative-phase information. The wireless communication method also includes generating precoding matrices comprising bg, p1, p2, and p3 bit groups, wherein each of the precoding matrices are generated by quantization using at least the gain information and the relative-phase information between antenna elements, The method further includes selecting the best precoding matrix among the generated precoding matrices, and transmitting the bit sequence representing the selected precoding matrix to a base station.

According to one or more embodiments of the present invention, a non-transitory computer readable medium includes software instructions, that when executed, are configured to perform a wireless communication method in a mobile terminal for supporting precoding matrix feedback for multi-user and single-user multiple-input and multiple-output (MIMO) systems. The non-transitory computer readable medium also includes obtaining, at the mobile terminal, channel state information comprising at least gain information and relative-phase information, and generating precoding matrices comprising bg, p1, p2, and p3 bit groups, wherein at least one of the precoding matrices is generated by quantization using at least the gain information and the relative-phase information. Further, the non-transitory computer readable medium includes selecting the best precoding matrix among the generated precoding matrices, and transmitting the bit sequence representing the selected precoding matrix to a base station.

According to one or more embodiments of the present invention, a mobile terminal supports precoding matrix feedback for multi-user and single-user multiple-input and multiple-output (MIMO) systems. The mobile terminal includes a structured codebook to select a precoding matrix, wherein the structured codebook includes, at least, a joint gain and permutation codebook, an intra-subvector phase codebook, and an inter-subvector phase codebook. The mobile terminal also includes a receiver, wherein the receiver of the mobile terminal receives channel state information (CSI) comprising at least gain information and relative-phase information. Further, the mobile terminal includes and a generating unit, wherein the generating unit of the mobile terminal generates bit sequence representing bit-allocation of each of the joint gain and permutation codebook, the intra-subvector phase codebook and the inter-subvector phase codebook for the optimal precoding matrix, by using at least the gain information and the relative-phase information between antenna elements. The mobile terminal also includes a transmitter, wherein the transmitter of the mobile terminal transmits at least the bit sequence to a base station.

Other aspects and advantages of the invention will be apparent from the following description and the appended claims.

BRIEF DESCRIPTION OF DRAWINGS

FIG. 3 is a table 1 of a 2-bit joint gain and permutation codebook according to one or more embodiments of the present disclosure.

FIG. 4 is a table 2 of a 3-bit joint gain and permutation codebook according to one or more embodiments of the present disclosure.

FIG. 5 is a table 3 of a 4-bit joint gain and permutation codebook according to one or more embodiments of the present disclosure.

FIG. 6 is a table 4 of a 4-bit joint gain, permutation and bit-allocation codebook according to one or more embodiments of the present disclosure.

FIG. 7 is a table 5 that is a flow-chart of rank-1 PMI low-complexity search based on matching to a single 4×1 target vector using the proposed codebook structure according to one or more embodiments of the present disclosure.

FIG. 8 is a table 6 that is a flow of operations including a gain difference Gdiff between antennas 1 and 2 and antennas 3 and 4 according to one or more embodiments of the present disclosure.

FIG. 9 is a table 7 that shows optimal designs coming out of tests on data from an ITU-R Urban Micro Channel model with non Line of Sight Data and ½ wavelength antenna spacing. Performance is measured in by the log2( ) value of the expected quantization error performance (lower value is better) according to one or more embodiments of the present disclosure.

FIG. 10 is a table 8 that shows a method of indicating rank via a "Rank Indicator" and the associated vectors for rank 1, 2, 3, and 4.

FIG. 11 is a table 9 that shows a method of indicating rank 1 or rank 2, with a flexible definition of the rank 2 accompanying vector according to one or more embodiments of the present disclosure.

DETAILED DESCRIPTION

Figure 1:
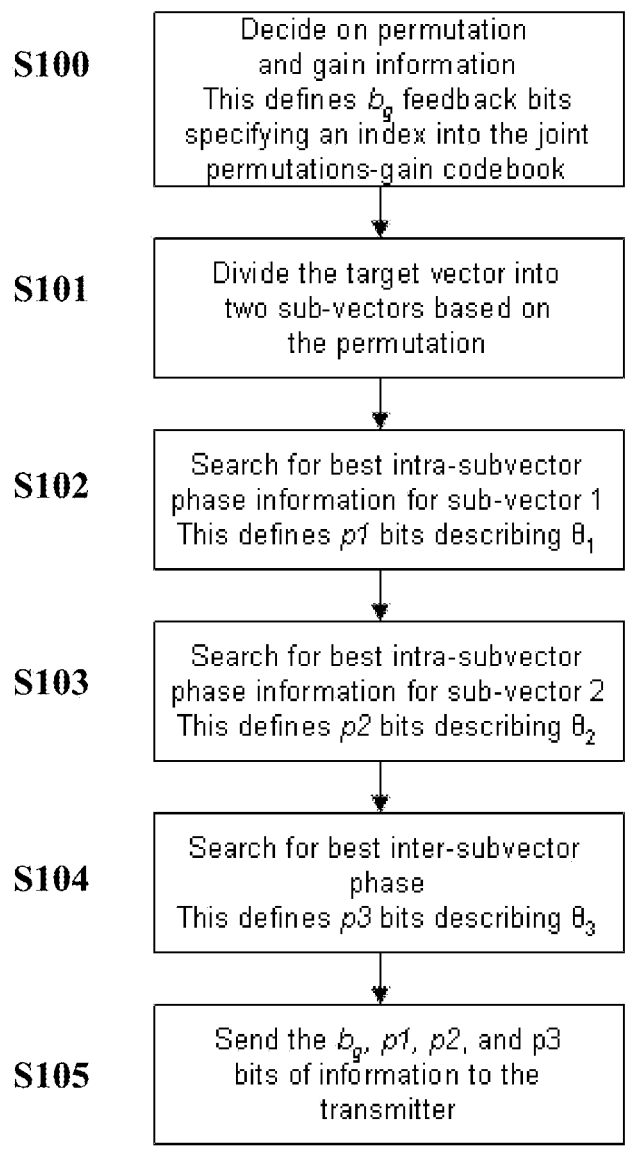
FIG. 1 is a flowchart of a quantization process according to one or more embodiments of the present disclosure.

In embodiments of the invention, numerous specific details are set forth in order to provide a more thorough understanding of the invention. However, it will be apparent to one with ordinary skill in the art that the invention may be practiced without these specific details. In other instances, well-known features have not been described in detail to avoid obscuring the invention.

For purposes of readability and illustration, one or more embodiments of the present disclosure relate generally to codebook designs. According to one or more embodiments, a codebook W is a set of indexed code vectors which are used to quantize the channel matrix or its eigenvectors, etc. Further, the more quantization bits, the better one can match the channel estimated at the receiver. Additionally, an important issue in codebook-based precoding transmission is how to design the codebook so that only a relatively small number of bits are feedback to the transmitter side which are used for generating precoding transmit vectors, thereby consuming relatively limited uplink resources. Another important issue is how to choose the metric which serves for selecting the best codebook vector from available set W. For example, in the scenario of 4 transmitting antennas, and with users having up to 2 receiving antennas, the system may send a single stream to each of say four users, sending streams concurrently in time and frequency via MU-MIMO. To allow for this joint MU-MIMO transmission, each such user in this scenario will describe to the transmitter a 4×1 preferred precoding transmit vector (sub-space representation (i.e. "rank 1 approximation")) of the total 4×2 channel state space they are experiencing between the transmitter and their two receive antennas. Those of ordinary skill in the art would appreciate that embodiments of the invention are scalable to include more transmitting antennas and receiving antennas. Accordingly, the invention is not limited to 4 transmitting antennas and 2 receiving antennas.

According to one or more embodiments of the present disclosure, there exists a case in which the CS of antennas are relatively independent, and channel/deployment scenarios where the channel is sufficiently stable over time (e.g. 20 msec) and sufficiently coherent over a block in frequency (e.g. over 1 MHz) such that accuracy of CS is not strongly impacted by channel dynamics or delays in feedback. In such a case, when users have signal to noise ratios (SNRs) between 6 and 10 dB, the minimum number of bits that are needed to describe the CSI of each user can range from 8 to 20 "CSI feedback bits." CSI feedback bits represent the minimum number of bits that are necessary to provide sufficient CSI accuracy so that the MU-MIMO transmission is not strongly intra-interference limited.

One or more embodiments of the present invention provide a low complexity apparatus and method which has the ability to support a greater number of CSI feedback bits, e.g. 8 to 12 bits, up to 20 bits and greater. The design is structured, breaking the CSI feedback bits into different parameters which may be individually searched in a sequence of operations. The particular structure chosen allows for low-complexity approaches in determining the CSI feedback bits, and in calculating associated parameters such as rank and channel quality. The particular representation for the gain via a joint permutation and gain vector is very efficient. Further, the designs, extend rank-1 elements to rank-(n>1) elements via simple operations. Furthermore, the designs may be naturally extended to a design for 8 transmitting antennas. The use of gain information and relative-phase parameters also has the potential to extend to cases such as Coordinated Multi-Point (CoMP) and various polarized antenna relationships.

More specifically, according to one or more embodiments of the present disclosure, a structured codebook design is disclosed which combines principles of classic product vector quantizers, permutation vector quantizers, and partial order bit-allocation quantizers. Further, embodiments of the present invention allow for a specific application to that of channel state information (CSI) quantization, and structured searches which match those applicable to different wireless deployment scenarios.

The codebook design and search method according to one or more embodiments of the present disclosure provides a low complexity way to support large numbers of PMI bits than presently used in LTE. The design is structured, breaking the PMI bits into different parameters which can be individually searched in groups of subvectors using a sequence of operations. In some cases, such groups of operations and subvectors naturally match expected properties of antennas and antenna deployment scenarios.

According to one or more embodiments of the present invention, a structured codebook may include a joint gain and permutation codebook, an intra-subvector phase codebook, and an inter-subvector phase codebook.

The design and search method according to one or more embodiments of the present disclosure may also provide a way to easily define rank n>1 pre-coding matrix codebooks by simple operations (e.g. permutations and conjugations) on rank 1 elements. This further enables structured calculations to reduce computational load in PMI and channel quality indication (CQI) determinations. The design may advantageously use the existing type of feedback mechanism in LTE consisting of a Precoding Matrix Indicator and a Rank Indicator.

Furthermore, the designs can be naturally extended to accommodate other numbers of transmitting antennas, e.g. 5, 6, 8, etc. The use of gain information and relative-phase parameters also has the potential to extend to cases such as CoMP and various polarized antenna relationships.

According to one or more embodiments of the present disclosure, a rank-1 element, v: $v \in C^{4 \times 1}$, of a B-bit codebook $C_B$ is represented by a separate encoding of gain information and phase information into different bits. Each vector is represented by information defining two 2-dimensional sub-vectors and a relationship between such sub-vectors. Phase information represents both relative phase within each sub-vector and the relative phase between sub-vectors. The gain information is coded jointly across the 4 dimensional vector using a permutation codebook with an associated bit-allocation. The permutation assigns various antennas to sub-vectors, and thus various antennas to possible gain values. The gain values, defined by gain vectors, can also define bit-allocations to different phase components.

According to one or more embodiments of the present disclosure, for a target vector q: $q \in C^{4 \times 1}$, the codebook is designed to maximize a quantization of the channel direction, as apposed to the precise phases of the vector. Specifically, the optimal element in the codebook is selected by the following equation:

$$v_{opt} = \arg\max_{v \in C_B} |v^H q|$$

It should be noted that one effect of this definition of the optimal element is that the optimal selection is not affected by an overall phase scaling of either the target vector or any of the codebook elements. Specifically, this lack of affect is shown in, at least, the following equation:

$$v_{opt} = \arg\max_{v \in C_B} |v^H q| = \arg\max_{v \in C_B} \max_{-\pi \le \phi \le \pi} |v^H e^{j\phi} q|$$

Furthermore, as in general operation, q is a norm-1 vector. Any additional "gain" to this vector, representing the overall strength, e.g. signal-to-noise ratio, of the channel is represented by other parameters, e.g. a channel quality indicator (CQI) value.

The result is that the codebook structure has one less complex dimension that it needs to represent than if it were designed to represent mean-square error approximation to v. The one less dimension comes from the combination of the one irrelevant overall phase and the restriction to norm-1 vectors. Thus, the codebook elements "effectively" exist in a 3-dimensional subspace of a 4-dimensional space. This is in fact represented in the codebook by a codebook which assumes one of the elements of each vector $v \in C_B$ is in fact a real positive scalar (phase=0), and by $\|v\|=1$ for all $v \in C_B$.

Rank 1 PM Vectors and Parameters

According to one or more embodiments of the present disclosure, each element v is defined by 4 parameters. The first parameter is a joint gain vector and permutation specified using $b_g$ bits. This can also be used to define the bit-allocation between the 3 different phase components. The second and third parameters are two intra-subvector relative phase scalars $\theta_1$ and $\theta_2$ represented by $p_1$ and $p_2$ bits respectively. The fourth parameter is an inter-subvector phase scalar $\theta_3$ represented by $p_3$ bits.

Further, according to one or more embodiments of the present disclosure, a B bit codebook is defined by $b_g + p_1 + p_2 + p_3 = B$ for all possible vector elements defined in the codebook. Thus the $2^B$ combinations of bits represented in all combinations of all values of the 4 parameters defines $2^B$ unique code vectors.

Note, the values $p_1$, $p_2$, and $p_3$ do not have to be the same for different elements of the codebook. As noted above, the value of $p_1$, $p_2$ and $p_3$ can adapt to the information defined in the $b_g$ gain/permutation bits. This may be of particular interest for large B According to one or more embodiments of the present disclosure, each element v has the following structure:

$$v = \begin{bmatrix} w(i(1)) \\ w(i(2)) \\ w(i(3)) \\ w(i(4)) \end{bmatrix}$$

where $\{i(1), i(2), i(3), i(4)\}$ is a specified permutation of $\{1, 2, 3, 4\}$ with $$w = \begin{bmatrix} w(1) \\ w(2) \\ w(3) \\ w(4) \end{bmatrix} = \begin{bmatrix} g(1) \\ g(2)e^{j\theta_1} \\ e^{j\theta_3} \begin{bmatrix} g(3) \\ g(4)e^{j\theta_2} \end{bmatrix} \end{bmatrix}$$

and where the $\{i(1), i(2), i(3), i(4)\}$ and $\{g(1), g(2), g(3), g(4)\}$ are defined in a joint codebook We now describe in detail the representation of each of these parameters.

Joint Permutation and Gain Codebook

The permutation $I = \{i(1), i(2), i(3), i(4)\}$ and gain vector $g = \{g(1), g(2), g(3), g(4)\}$ are defined as one of $2^{\{g_b\}}$ combinations. These combinations form a $g_b$-bit codebook. Different B values will often use different values of $g_b$, as defined by the relative accuracy needed of such information within the context of a total bit budget B. Each such value of $g_b$, can also have a different structure.

A codebook design for $g_b=2$ bits is shown in FIG. 3, according to one or more embodiments of the present disclosure. There are a number of useful points to note in this embodiment. A first point is that there is a single gain vector which is defined though a value a in dB. It can be assumed that α>0, so that the first element g(1)>g(2)=g(3)=g(4). Another point is that the first element in the k-th permutation is k. Essentially, one of the best permutation for representing a target CS is the k-th if the k-th antenna of the CS is the one with the largest gain. This antenna gets the largest gain value g(1). Further, in the design of such a codebook the value α to be used can be pre-selected using tests on simulations over a variety of conditions in order to maximize the overall performance of the quantizer. An example of this is given later.

FIG. 4, Table 2, shows one potential design of a joint permutation-gain codebook for $g_b=3$ bits according to one or more embodiments of the present disclosure. There are a number of useful points to note relating to this embodiment. A first point is that there are two gain vectors, where one is the equal gain vector. The other gain vector is defined through a value β in dB. We assume β>0, so that the first element g(1)=g(2)>g(3)=g(4).

Another point worth noting is that, according to one or more embodiments of the present disclosure, the permutation for codebook index value 0 is associated with use of the equal gain vector. Thus, in terms of the gain, many permutations can be used, all being equivalent in assigning gains to antennas. However, in the method it may be necessary to specify a permutation in order to map antennas to sub-vectors. Thus the permutation [1,2,3,4] is used without loss in generality.

Further, it is also worth noting that, for one or more embodiments according to the present disclosure, the permutations for codebook index values 1, 2, . . . , 6 represent a selection of two antennas as the ones to get the larger gain values {g(1),g(2)}. These elements represent use of an unequal gain gain-vector. As worth noting, the unequal-gain gain vector may be parameterized by a value β. This value can be designed, and chosen apriori, via a search using many simulations over a variety of conditions.

Additionally, it is also worth nothing that, for one or more embodiments of the present disclosure, the gain vector allows the quantizer to handle the case of independent antennas, where antennas will naturally experience different scaling factors. Further, this design can also be very applicable for cross-polarized arrangements even with strongly dependent antennas. Specifically, in cross-polarized arrangements one polarization can have a different average antenna "receive strength" as compared to another polarization. Here at least two of the permutations in values 1, 2, . . . , 6 are useful in representing that gain imbalance between the two pairs of antennas in a cross-polarized arrangement.

FIG. 5, Table 3, shows a design of a joint permutation-gain codebook for $g_b=4$ bits according to one or more embodiments of the present disclosure. It is worth noting that there are three gain vectors. One is defined by a value κ in dB. The value κ is greater than 0 dB, so that the first element g(1)>g (2)=g(3)=g(4). The other two are defined by one of two values, δ and T respectively (both in dB). Both values are greater than 0 dB, so that the first element g(1)=g(2)>g(3)=g(4). The increased number of elements and parameters allows finer modeling of gain variations between antennas. Additionally, the permutations for index values 1, 2, . . . , 6 and 7, 8, . . . , 15 represent a selection of two antennas as the ones to get the larger gain values {g(1),g(2)}. As with the 3-bit design, the permutation structure may also be useful in cross polarized arrangements.

Joint Permutation, Gain, and Phase-bit Allocations

According to one or more embodiments of the present disclosure, a design of the permutation-gain codebook can be extended to a design which allows the bit-allocation to different phase components to adapt with the gain vector and permutation used. For example, if one takes the case of B=20 and an embodiment of a design which uses the 4-bit gain codebook structure as shown in FIG. 5, p1+p2+p3=20−4=16 for such a design.

In another example, according to one or more embodiments of the present disclosure, if for the permutation-gain elements corresponding to index values 0, 1, 2, 3, one assumes that the design is such that the value κ is a moderate value, e.g. on the order of 3.0 dB, the design uses more bits for p1 than for p2. This is because the first sub-vector has an antenna with higher gain than the second sub-vector. However, given the moderate gain difference, only one more bit is assigned to p1 over p2.

In another example, according to one or more embodiments of the present disclosure, if for the permutation-gain elements corresponding to index values 4, 5, . . . , 9, one assumes that the design is such that the value δ is a larger value, e.g. on the order of 9.0 dB, then again, in this case the design uses more bits for p1 than for p2. This is because the first sub-vector has an antenna with higher gain than the second sub-vector. However, given the larger gain difference, 3 more bits (3 less bits) are assigned to p1 (p2) than for index values 0, 1, 2, 3.

Figure 2:
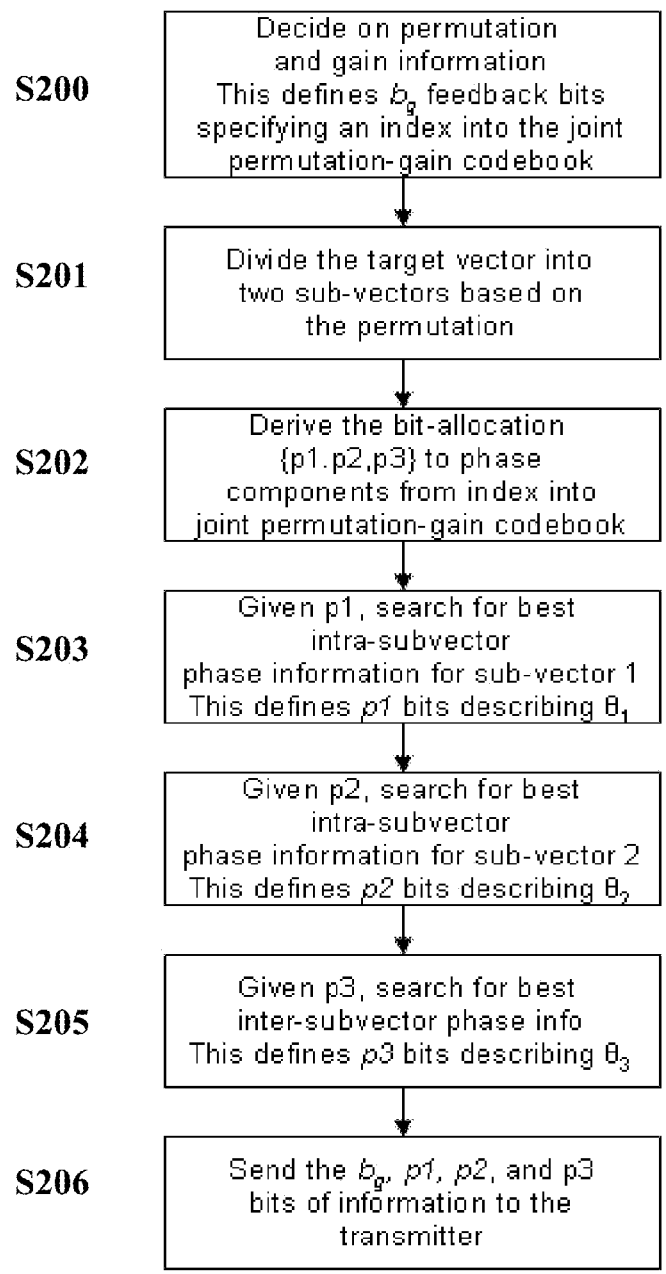
FIG. 2 is a flowchart of a quantization process using an adaptive bit-allocation to phase components according to one or more embodiments of the present disclosure.

In another example, according to one or more embodiments of the present disclosure, if for the permutation-gain elements corresponding to index values 10, 11, . . . , 15, one assumes that the design is such that the value τ is a moderate value, e.g. on the order of 3.0 dB, yet again, in this case as well the design uses more bits for p1 than for p2, but here the difference in bit-allocation is less, with only 1 more bit assigned to p1 over p2. This design principle can also be naturally extended to the 3-bit codebook design in FIG. 4. A flow-chart of the quantization process is shown in FIG. 2.

Phase Codebooks

According to one or more embodiments of the present disclosure, the phase codebooks each represent a sampling of phases from 0 to 2π. Further, in one or more embodiments, a uniform sampling of phases can be used where the sampling granularity is defined by the number of bits (i.e. $p_1$, $p_2$, or $p_3$) for the given phase value. Such bit assignments, as noted before, are possibly adaptive to the gain-permutation information.

According to one or more embodiments of the present disclosure, for the intra-subvector phases using uniform sampling, one can think of the phase codebook as a codebook of 2-dimensional vector elements as follows:

Intra-subvector phase codebook "k" =

$$\Phi_k = \left\{ \begin{bmatrix} 1 \\ e^{j2\pi 0/P_k} \end{bmatrix} \begin{bmatrix} 1 \\ e^{j2\pi 1/P_k} \end{bmatrix} \cdots \begin{bmatrix} 1 \\ e^{j2\pi(P_k-1)/P_k} \end{bmatrix} \right\} =$$

$$\{ \phi_{k,0} \quad \phi_{k,1} \quad \cdots \quad \phi_{k,P_k-1} \} \text{ where } P_k = 2^{p_k}$$

Similarly, the inter-subvector phase codebook follows a similar structure, except that only a scalar value is needed as show here:

Inter-subvector phase codebook $$\Omega = \{ e^{j2\pi 0/P_3} \quad e^{j2\pi 1/P_3} \quad \ldots \quad e^{j2\pi(P_3-1)/P_3} \}$$
$$= \{ \omega_0 \quad \omega_1 \quad \ldots \quad \omega_{P_3-1} \} \text{ where } P_3 = 2^{p_3}$$

The use of these vector and scalar codebooks are useful when executing low-complexity codebook searches.

Low-Complexity Search for Optimal PMI

According to one or more embodiments of the present disclosure, a codebook structure may allow one to implement low-complexity strategies that can be applied to the existing rank-1 feedback search which assumes maximal-ratio combining (MRC) at the receiver as discussed below.

The codebook structure and low-complexity strategies can also be applied to a search of a value $q \in C^{4\times1}$, $\|q\|=1$, defined by a principle component analysis. This provides at least one illustrative embodiment of the search method which could be applied to CS feedback where CS is determined by such a principle component analysis.

FIG. 7, outlines the steps and associated rougher complexity estimates with such a search according to one or more embodiments of the present disclosure. Further, FIG. 1 outlines the basic flow-chart of operations according to one or more embodiments of the present disclosure. As shown in FIG. 1, permutation and gain information can be determined by a simple ordering of the energy, also known as gain, seen on different antennas. Intra-subvector phase information is searched independently and separately for each sub-vector. The search of the inter-subvector information is a low-complexity search using some pre-computed scalar values which depend on the intra-subvector phase and gain information.

Specifically, as shown in FIG. 1, according to one or more embodiments of the present disclosure, the quantization process which begins with selecting permutation and gain information by defining $b_g$ feedback bits specifying an index into a joint permutation-gain codebook (S100). Next in the quantization process comes dividing the target vector into two sub-vectors based on the permutation (S101). Once divided, next comes selecting intra-subvector phase information for sub-vector 1 by defining p1 bits describing $\theta_1$ (S102), selecting intra-subvector phase information for sub-vector 2 by defining p2 bits describing $\theta_2$ (S103), and selecting inter-subvector phase by defining p3 bits describing $\theta_3$ (S104). Finally, the quantization process is completed by grouping $b_g$, p1, p2, and p3 bits of information into the precoding matrix indicator for transmission to the base station (S105).

As shown in FIG. 2, according to one or more embodiments of the present disclosure, quantization in the mobile terminal using adaptive bit-allocation and phase components beings with selecting permutation and gain information by defining $b_g$ feedback bits specifying an index into the joint permutation-gain codebook (S200). Once selected, quantization continues by dividing the target vector into two sub-vectors based on permutation (S201) and deriving the bit-allocation {p1, p2, p3} to phase components from index into joint permutation-gain codebook (S202. Once divided and derived next comes, selecting, given p1, intra-subvector phase information for sub-vector 1 by defining p1 bits describing $\theta_1$ (S203), selecting, given p2, intra-subvector phase information for sub-vector 2 by defining p2 bits describing $\theta_2$ (S204), and selecting, given p3, inter-subvector phase by defining p3 bits describing $\theta_3$ (S205). Finally, the quantization process is completed by grouping $b_g$, p1, p2, and p3 bits of information into the precoding matrix indicator for transmission to the base station (S206).

Performance Example With Joint Permutation and Gain Encoding

As an example of quantizing gain, and the efficiency of the joint permutation-gain approach and the low-complexity search method of FIG. 6, experimental results on the quantization error performance of the proposed method are provided in FIG. 9.

The quantization error of a codebook $C_B$ may be quantified using the following metric:

Quantization error performance=Expected Value over data "q" of $(1-\max_{v \in C_B} |v^H q|^2)$ The lower the value of this quantization error, the better the performance of the design.

FIG. 9, shows the performances of the optimal designs coming from a test using ITU-R channels according to one or more embodiments of the present disclosure. The data set represents 800,000 samplings of channels "q" using many randomly generated of the time-domain response of the channel. These time domain responses are used to sample 4×1 frequency domain CS values of the channel at various points in frequency. The channel scenario used is that of an Urban Micro (UMi) channel with co-polarized antennas at ½ wavelength spacing in a non Line of Sight (nLOS) condition. A theoretical upperbound on performance of a B bit quantizer operating on channel samples coming from independent antennas with Rayleigh channels is $2^{-B/3}$. Thus for B=12 bits the $\log_2(\ )$ of this upperbound value is −4.0. Tests show that the Urban Micro scenario described has about the same upperbound performance.

As FIG. 9 shows, performance improves monotonically from $b_g$=0 to 4 bits, for increasing size of the permutation-gain codebook design up to 4 bits. Furthermore, at $b_g$=12 the near upperbound is reached as defined by Rayleigh channels, which is also the near upperbound for this UMi scenario. The results show, therefore, that representing information on the gain in the CS is an important performance enhancer. Furthermore, the proposed design and quantization search method yields near upperbound performance.

Rank-(n>1) Extensions

According to one or more embodiments of the present disclosure, for every possible target, defined by a combination of permutation-gain and phase indices g*, n*, m* and r*, (i.e. values g, permutation, and values $\theta_1$, $\theta_2$, and $\theta_3$) there is an easy way to define a Rank-(n>1) (n≤4) companion to the Rank-1 vector.

Specifically, as an example, one may consider the rank-1 codebook element as follows:

$$v = \begin{bmatrix} w(i(1)) \\ w(i(2)) \\ w(i(3)) \\ w(i(4)) \end{bmatrix} \text{ where } w = \begin{bmatrix} w(1) \\ w(2) \\ w(3) \\ w(4) \end{bmatrix} = \begin{bmatrix} \begin{bmatrix} g(1) \\ g(2)e^{j\theta_1} \end{bmatrix} \\ e^{j\theta_3} \begin{bmatrix} g(3) \\ g(4)e^{j\theta_2} \end{bmatrix} \end{bmatrix}$$

with {i(1), i(2), i(3), i(4)} as a specified permutation of {1, 2, 3, 4}

With the above rank-1 codebook under consideration, one potential definition of a corresponding rank-2 codebook element is defined by:

$$v2 = \begin{bmatrix} w2(i(1)) \\ w2(i(2)) \\ w2(i(3)) \\ w2(i(4)) \end{bmatrix} \text{ where}$$

$$w2 = \begin{bmatrix} w2(1) \\ w2(2) \\ w2(3) \\ w2(4) \end{bmatrix} = \begin{bmatrix} e^{-j\theta_3} \begin{bmatrix} -g(2)e^{-j\theta_1} \\ g(1) \end{bmatrix} \\ \begin{bmatrix} -g(4)e^{-j\theta_2} \\ g(3) \end{bmatrix} \end{bmatrix}$$

with {i(1), i(2), i(3), i(4)} and {g(1), g(2), g(3), g(4)} being the same gain and permutation used in the corresponding rank−1 element.

This is just one possible definition, because there are many possible vectors v2 orthogonal to v. One property of this particular definition, is that the sub-vectors maintain the same gain values, i.e. pairs of elements in v2 and use the same pair of gains as in v. Also, because the assignment of antennas to different sub-vectors is preserved, PMI and CQI searches can, for rank-1 and rank-2 determination and searches, be broken down conveniently into sub-vectors. Furthermore, the definition is easily formed by simple flipping of pairs of elements, and negations and conjugations of values.

According to one or more embodiments of the present disclosure, Rank-3 and Rank-4 elements can also be defined.

For example, according to one or more embodiments of the present disclosure, the following vector u3 is orthogonal to v, but not necessarily orthogonal to v2.

$$u3 = \begin{bmatrix} w3(i(1)) \\ w3(i(2)) \\ w3(i(3)) \\ w3(i(4)) \end{bmatrix} \text{ where } w3 = \begin{bmatrix} w3(1) \\ w3(2) \\ w3(3) \\ w3(4) \end{bmatrix} = \begin{bmatrix} e^{-j\theta_3} \begin{bmatrix} g(3) \\ -g(4)e^{-j\theta_2} \end{bmatrix} \\ \begin{bmatrix} -g(1) \\ g(2)e^{-j\theta_1} \end{bmatrix} \end{bmatrix}$$

with {i(1), i(2), i(3), i(4)} and {g(1), g(2), g(3), g(4)} being the same gain and permutation used in the corresponding rank−1 element.

One can, however, define a rank-3 element v3 as follows:

$v3=x3/\|x3\|$ where $x3=u3-(v2^H u3)u3$

Note, $\|x3\|^2 = 1 - |v2^H u3|^2$

Further, according to one or more embodiments of the present disclosure, the following vector u4 is orthogonal to v, but not necessarily orthogonal to v.

$$u4 = \begin{bmatrix} w4(i(1)) \\ w4(i(2)) \\ w4(i(3)) \\ w4(i(4)) \end{bmatrix} \text{ where } w4 = \begin{bmatrix} w4(1) \\ w4(2) \\ w4(3) \\ w4(4) \end{bmatrix} = \begin{bmatrix} e^{-j\theta_3} \begin{bmatrix} g(4)e^{j\theta_2} \\ g(3) \end{bmatrix} \\ \begin{bmatrix} -g(2)e^{j\theta_1} \\ -g(1) \end{bmatrix} \end{bmatrix}$$

with {i(1), i(2), i(3), i(4)} and {g(1), g(2), g(3), g(4)} being the same gain and permutation used in the corresponding rank−1 element.

One can, however, define a rank-4 element v4 as follows:

$v4=x4/\|x4\|$ where $x4=u4-(v^H u4)u4$

Note, $\|x4\|^2 = 1 - |v1^H u4|^2$

According to one or more embodiments of the present disclosure, in the system, rank n>0 feedback (and requested transmission) by a user can follow two procedures. One procedure is that the vectors v, v2, v3, and v4, are ordered. Feedback would include 2 additional bits, a Rank Indicator (RI), specifying the requested rank that the receiver would like used. Here rank=1 would imply only v, rank=2 would imply use of the pair {v, v2}, rank=3 would imply use of the triplet {v, v2, v3}, and rank=4 would imply use of all dimensions {v, v2, v3, v4}. This is described in FIG. 10, which follows the procedure now used with the 4-bit codebook in LTE Release 9.

Another example would be to allow for flexible selection of the $2n^d$ vector in a rank-2 requested feedback scenario. For example, only two more additional bits is sufficient to feedback the second vector accompanying the rank-1 vector in case of rank-2 transmission. This is described in FIG. 11.

Infrequent Gain-Feedback Extensions for Cases with Large Antenna Gain Imbalances According to one or more embodiments of the present disclosure, the gain-vectors included in the permutation-gain codebook allow for the modeling of a range of gain differences (and variations) between antennas. For cases with a larger range of gain differences between antennas one could consider designs with larger numbers of bits "$b_g$" for gain, though this may also necessitate larger B in order not to compromise on the phase accuracy.

However, there are examples where gain-differences between antennas are partially due to factors that change more slowly than the rate at which CSI feedback updates are given by the receiver to the transmitter. These include distributed antenna and Coordinated Multi-Point (CoMP) scenarios where transmitting antennas are located at a number of different geographic locations. Thus, relatively static path loss differences between a receiver and different transmit antennas (or groups of antennas) can exist.

For example, according to one or more embodiments of the present disclosure, antennas 1 and 2 are located much closer to a receiver than antennas 3 and 4. In such a case, the system could be extended to request, or infer from other information, a relatively static gain difference $G_{diff}$, $G_{diff} > 0$, that exists between antennas 1 and 2 and antennas 3 and 4 on average.

This, for example, could be supported by separate path-loss measurements by the UE of each of the locations where the different pairs of antennas reside. Path-loss measurements at the UE can be carried out on separate CSI-RS (channel state information reference signals) configurations for antennas 1 and 2 and antennas 3 and 4. The path-loss measurements can either be feedback by the receiver to the base station at a large duty cycle (100 msec order) or not feedback at all and be directly estimated by each of the distributed points based on uplink sounding reference signals (SRS) transmitted from the UE. A person of ordinary skill in the art will appreciate that alternative ways exists.

According to one or more embodiments of the present disclosure, with the above discussed support, and the information "$G_{diff}$" being available both to the transmitter and the receiver, the permutation-gain codebook can be used to focus on and to describe, more efficiently, random fluctuations in the gain due to effects such as fast-fading.

A process to do so is outlined in FIG. 8. Specifically, the process of FIG. 8 includes modifications to the steps in FIG. 7 to account for $G_{diff}$. Specifically, Step 1A is included which selects a gain vector after taking $G_{diff}$ out of the determination of the gain vector. Also, Step 1B creates a new gain vector g2 defined by the selected gain vector and $G_{diff}$. In Step 1C, because the overall antenna gain is important in driving bit-allocation, the bit-allocation is driven by an integer value which is derived jointly from this gain difference and the gain-vector. Further, each integer value has a look up table which defines the bit allocation {p1, p2, p3} to be used. The remaining steps 3, 4, 5, and 6 use the new vector g2 defined by the selected gain vector and $G_{diff}$.

A codebook search which includes receiver processing into the metric

In selecting a rank-1 or rank-2 description of the CS the receiver can take into account an estimate of the post-beamforming signal to noise ratio SNR it may experience in different frequency bands, and the rate supported by these SNRs. This, in fact, is the process suggested by LTE for use with the existing 4-bit codebooks. This procedure is well known to those familiar with the state of the art.

According to one or more embodiments of the present disclosure, the receiver has measured the 4×2 CSI for T bands, indexed by t=1, 2, ..., T. The CSI for band t is denoted as $Q_t$ where $Q_t$ is a complex 4×2 matrix. The quantized rank-1 CS value sent by the receiver to the transmitter is v as previously described. The receiver can then estimate a "channel quality" supported by using this v as a beamforming vector at the transmitter using the following calculation:

Channel Quality using $v=2^{SNR(v)}$ where $$SNR(v) = \frac{1}{T}\sum_{t=1}^{T} \log_2(1 + \|Q_t^H v\|^2)$$

A person of ordinary skill in the art will appreciate that, the structure of the codebook design can be used to search for good v with respect to this Channel Quality metric. To do so one can include the metric into each of the search steps in FIG. 7 and FIG. 8, with some modifications to the specifics of the search mathematics.

For example, one or more embodiments of the present disclosure is as follows, were gain determination includes changes in FIG. 7. Specifically, one would make the assumption that a single vector "v" can perfectly align all the phases in all the matrices $Q_t$, t=1, ..., T. This allows one to do the following calculation, similar to Step 1 in FIG. 7 and FIG. 8.

$$\text{Let } Q_t = \begin{bmatrix} q_{t,1,1} & q_{t,1,2} \\ q_{t,2,1} & q_{t,2,2} \\ q_{t,3,1} & q_{t,3,2} \\ q_{t,4,1} & q_{t,4,2} \end{bmatrix}$$

$$\text{and define } H_t = \begin{bmatrix} |q_{t,1,1}| + |q_{t,1,2}| \\ |q_{t,2,1}| + |q_{t,2,2}| \\ |q_{t,3,1}| + |q_{t,3,2}| \\ |q_{t,4,1}| + |q_{t,4,2}| \end{bmatrix} = \begin{bmatrix} h_{t,1} \\ h_{t,2} \\ h_{t,3} \\ h_{t,4} \end{bmatrix} \in C^{4 \times 1}$$

For each gain vector g={g(1), g(2), g(3), g(4)} and associated permutation Φ={i(1),i(2), i(3), i(4)} calculate $$SNR(g, \Phi) = \frac{1}{T}\sum_{t=1}^{T}\log_2\left(1 + \sum_{a=1}^{4}|h_{t,a}g(i(a))|^2\right)$$

In contrast to searching over a single value "q", the search may have to consider all combinations separately rather than using an ordering of antennas by gain. This new search has complexity that scales with $2^{\{g_b\}}$. However, if the channels $Q_t$, t=1, ..., T are very similar, i.e. show a strong degree of coherence, a search using an ordering of antennas by gain could be used.

Intra-Subvector Phase Determination: Changes in FIG. 7.

The determination of phase for one subvector has little influence on the determination of the phase of the other subvector. The optimal search may consider a joint search over both intra-subvector phases and inter-subvector phases. However, this may lead to negligible gains for sufficiently large p1, p2, and p3. Thus, intra-subvector phases can be searched independently. To search each intra-vector phase one need only take the case of the first sub-vector and the case of the second subvector follows naturally.

$$\text{Let } r_{t,1} = \begin{bmatrix} g(i(1))(q_{t,i(1),1} + q_{t,i(1),2}) \\ g(i(2))(q_{t,i(2),1} + q_{t,i(2),2}) \end{bmatrix} \in C^{2 \times 1}$$

Where the optimal permutation Φ={i(1), i(2), i(3), i(4)} and the optimal gain vector g={g(1), g(2), g(3), g(4)}

$$n^* = \text{argmax}_{n=0,1,\ldots,P_1-1}\sum_{t=1}^{T}\log_2(1 + |\phi_{1,n}^H r_{t,1}|^2)$$

The optimal index m* for the intra-subvector phase for the second subvector follows.

Inter-Subvector Phase Determination: Changes in FIG. 7.

The determination of phase for one subvector has little influence on the determination of the phase of the other subvector. The optimal search would consider a joint search over both intra-subvector phases and inter-subvector phases. However, this may lead to negligible gains for sufficiently large p1, p2, and p3. To search each intra-vector phase one need only take the case of the first sub-vector and the case of the second subvector follows naturally.

$$\text{Let } r_{t,1} = \begin{bmatrix} g(i(1))(q_{t,i(1),1} + q_{t,i(1),2}) \\ g(i(2))(q_{t,i(2),1} + q_{t,i(2),2}) \end{bmatrix} \in C^{2 \times 1} \text{ and}$$

$$r_{t,2} = \begin{bmatrix} g(i(3))(q_{t,i(3),1} + q_{t,i(3),2}) \\ g(i(4))(q_{t,i(4),1} + q_{t,i(4),2}) \end{bmatrix} \in C^{2 \times 1}$$

Where the optimal permutation Φ={i(1), i(2), i(3), i(4)} and the optimal gain vector g={g(1), g(2), g(3), g(4)}
Let $\rho_{t,1} = \phi_{1,n^*}^H r_{t,1}$ and $\rho_{t,2} = \phi_{2,m^*}^H r_{t,2}$
Then $$r^* = \text{argmax}_{r=0,1,\ldots,P_3-1}\sum_{t=1}^{T}\log_2(1 + |\rho_1 + \omega_r\rho_2|^2)$$

Extensions to Even Numbers of Antennas Greater Than 4.

In the above description of operations, according to one or more embodiments of the present disclosure, the gain was jointly encoded over all dimensions. It is also possible to split the dimensions over which the joint encoding of gain is performed. This, in fact, becomes important for higher order MIMO (e.g., 8Tx) and CoMP transmission.

Specifically, for the case of 8Tx for example, the gain joint encoding can be conducted over all the 8 dimension g=[g(1), g(2), g(3), g(4), g(5), g(6), g(7), g(8)] or over each 4-dimensional subvectors separately g1=[g(1), g(2), g(3), g(4)] and g2=[g(5), g(6), g(7), g(8)].

$$w = \begin{bmatrix} w(1) \\ w(2) \\ w(3) \\ w(4) \\ w(5) \\ w(6) \\ w(7) \\ w(8) \end{bmatrix} = \begin{bmatrix} \begin{bmatrix} g(1) \\ g(2)e^{j\theta_1} \end{bmatrix} \\ e^{j\theta_3}\begin{bmatrix} g(3) \\ g(4)e^{j\theta_2} \end{bmatrix} \\ e^{j\theta_7}\begin{bmatrix} \begin{bmatrix} g(5) \\ g(6)e^{j\theta_4} \end{bmatrix} \\ e^{j\theta_6}\begin{bmatrix} g(7) \\ g(8)e^{j\theta_5} \end{bmatrix} \end{bmatrix} \end{bmatrix}$$

Extensions to other even numbers of antennas, e.g. 6 or 12 antennas, follows in a similar manner by building such quantizers out of smaller 2 or 4 dimensional quantizers and either quantizing the gain jointly or splitting the gain into sub-vectors (with their own individual permutations).

Extension to Odd Number of Dimensions

For the case of an odd number of dimensions, dimension splitting can be done as in the case of even number of dimensions but with one additional dimension remaining. For example, for the case of 5Tx transmission, the precoding vector is structured as below:

$$w = \begin{bmatrix} w(1) \\ w(2) \\ w(3) \\ w(4) \\ w(5) \end{bmatrix} = \begin{bmatrix} \begin{bmatrix} g(1) \\ g(2)e^{j\theta_1} \end{bmatrix} \\ e^{j\theta_3}\begin{bmatrix} g(3) \\ g(4)e^{j\theta_2} \end{bmatrix} \\ g(5)e^{j\theta_4} \end{bmatrix}$$

One straightforward way to extend the codebook design to the case of odd number of transmit antennas, according to one or more embodiments of the present disclosure, is to feedback the phase information $\theta 9_4$ of the remaining last dimension separately from the phase information of other dimensions, while the gain information can be still feedback by a joint encoding with the gain information of other dimensions (e.g., [g(1), g(2), g(3), g(4), g(5)]).

The proposed design is scalable to different number of antenna configurations, both even and odd, and different split of dimensions.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A wireless communication method in a mobile terminal for supporting precoding matrix feedback for multi-user and single-user multiple-input and multiple-output (MIMO) systems, comprising:

obtaining, at the mobile terminal, channel state information comprising at least gain information and relative-phase information;

generating precoding matrices comprising $b_g$, p1, p2, and p3 bit groups, wherein each of the precoding matrices are generated by quantization using at least the gain information and the relative-phase information between antenna elements;

selecting the best precoding matrix among the generated precoding matrices; and transmitting the bit sequence representing the selected precoding matrix to a base station.

2. The wireless communication method of claim 1, wherein at least one of the precoding matrices is quantized using at least 8 bits and can adaptively assign different permutations of bits to each of $b_g$, p1, p2, and p3 depending on at least the channel state information.

3. The wireless communication method of claim 1, wherein quantization in the mobile terminal comprises:

selecting permutation and gain information by defining $b_g$ feedback bits specifying an index into a joint permutation-gain codebook;

dividing a target vector into two sub-vectors based on the permutation;

selecting intra-subvector phase information for sub-vector 1 by defining p1 bits describing $\theta_1$;

selecting intra-subvector phase information for sub-vector 2 by defining p2 bits describing $\theta_2$;

selecting inter-subvector phase by defining p3 bits describing $\theta_3$; and grouping $b_g$, p1, p2, and p3 bits of information into the bit sequence representing the selected precoding matrix for transmission to the base station.

4. The wireless communication method of claim 3, wherein selecting permutation and gain information further comprises:

selecting, when using a 2-bit codebook, the antenna with the largest gain; and selecting, when using a 3-bit codebook or a 4-bit codebook, the two antennas with the largest gain and select the best of those two, wherein, when the gains are equal, consider the permutation with an unequal gain vector and calculate permutation-gain index (gaininerp) according to the following equation: gaininnerp=$\Sigma_{k=1}^{4} g(k)h(i(k))$ for both the permutation/gain combination and for the equal gain vector, and select the antenna that provides the best permutation-gain index.

5. The wireless communication method of claim 3, wherein selecting intra-subvector phase information for sub-vector 1 further comprises:

defining an optimal index when g(1)=g(2) by $$n^* = \mathrm{argmax}_{n=0,1,\ldots,P_1-1} |\phi_{1,n}^H q1|;$$

defining an optimal vector as $\phi_{1,n^*}$; and defining the optimal index, where g(1) is not equal to g(2), by $$n^* = \text{argmax}_{n=0,1,\ldots P_1-1} |\phi_{1,n}^H r1| \text{ where } r1 = \begin{bmatrix} g(1)q(i(1)) \\ g(2)q(i(2)) \end{bmatrix}.$$

6. The wireless communication method of claim 3, wherein selecting intra-subvector phase information for sub-vector 2 further comprises:
defining an optimal index for cases where g(3)=g(4) by $$m^* = \text{argmax}_{m=0,1,\ldots,P_2-1} |\phi_{2,m}^H q2|;$$

defining an optimal vector by $\phi_{2,m^*}$; and
defining the optimal index for cases where g(3) is not equal to g(4) by $$m^* = \text{argmax}_{m=0,1,\ldots,P_2-1} |\phi_{2,m}^H r2| \text{ where } r2 = \begin{bmatrix} g(3)q(i(3)) \\ g(4)q(i(4)) \end{bmatrix}.$$

7. The wireless communication method of claim 3, wherein selecting inter-subvector phase further comprises:
selecting the inter-subvector phase between q1 and q2 given the intra-subvector phase selections;
defining $$\rho_1 = \phi_{1,n^*}^H \begin{bmatrix} g(1)q(i(1)) \\ g(2)q(i(2)) \end{bmatrix} \text{ and } \rho_2 = \phi_{2,m^*}^H \begin{bmatrix} g(3)q(i(3)) \\ g(4)q(i(4)) \end{bmatrix};$$

defining the inter-subvector phase index by $$r^* = \text{argmax}_{r=0,1,\ldots P_3-1} |\rho_1 + \omega_r \rho_2|; \text{ and}$$

defining the optimal inter-subvector phase by $\omega_{r^*}$.

8. The wireless communication method of claim 1, wherein quantization in the mobile terminal using adaptive bit-allocation and phase components comprises:
selecting permutation and gain information by defining $b_g$ feedback bits specifying an index into the joint permutation-gain codebook;
dividing the target vector into two sub-vectors based on permutation;
deriving the bit-allocation {p1, p2, p3} to phase components from index into joint permutation-gain codebook;
selecting, given p1, intra-subvector phase information for sub-vector 1 by defining p1 bits describing $\theta_1$;
selecting, given p2, intra-subvector phase information for sub-vector 2 by defining p2 bits describing $\theta_2$;
selecting, given p3, inter-subvector phase by defining p3 bits describing $\theta_3$; and
grouping $b_g$, p1, p2, and p3 bits of information into bit sequence representing the selected precoding matrix for transmission to the base station.

9. The wireless communication method of claim 8, wherein selecting permutation and gain information further comprises:
selecting, when using a 2-bit codebook, the antenna with the largest gain when using a 2-bit codebook; and
selecting, when using a 3-bit codebook or a 4-bit codebook, the two antennas with the largest gain and select the best of those two,
wherein, when the gains are equal, consider the permutation with an unequal gain vector and calculate permutation-gain index (gaininerp) according to the following equation: gaininnerp=$\Sigma_{k=1}^4 g(k)h(i(k))$ for both the permutation/gain combination and for the equal gain vector, and select the antenna that provides the best permutation-gain index.

10. The wireless communication method of claim 8, wherein deriving the bit-allocation {p1, p2, p3} to phase components further comprises:
calculating dB$_{diff}$=log(∥[g2(1),g2(2)]∥/∥[g2(3),g2(4)]∥)
wherein the rounded integer value of dB$_{diff}$ defines the bit-allocation to p1, p2 and p3.

11. The wireless communication method of claim 8, wherein selecting, given p1, intra-subvector phase information for sub-vector 1 further comprises:
defining, for cases where g2(1)=g2(2), the optimal index by $$n^* = \text{argmax}_{n=0,1,\ldots,P_1-1} |\phi_{1,n}^H q1|;$$

defining the optimal vector by $\phi_{1,n^*}$; and
defining, for cases where g2(1) is not equal to g2(2), the optimal index by $$n^* = \text{argmax}_{n=0,1,\ldots,P_1-1} |\phi_{1,n}^H r1| \text{ where } r1 = \begin{bmatrix} g2(1)q(i(1)) \\ g2(2)q(i(2)) \end{bmatrix}.$$

12. The wireless communication method of claim 8, wherein selecting, given p2, intra-subvector phase information for sub-vector 2 further comprises:
defining, for cases where g2(3)=g2(4), the optimal index by $$m^* = \text{argmax}_{m=0,1,\ldots,P_2-1} |\phi_{2,m}^H q2|;$$

defining the optimal vector by $\phi_{2,m^*}$; and
defining, for cases where g2(3) is not equal to g2(4), the optimal index by $$m^* = \text{argmax}_{m=0,1,\ldots,P_2-1} |\phi_{2,m}^H r2| \text{ where } r2 = \begin{bmatrix} g2(3)q(i(3)) \\ g2(4)q(i(4)) \end{bmatrix}.$$

13. The wireless communication method of claim 8, wherein selecting, given p3, inter-subvector phase further comprises:
defining $$\rho_1 = \phi_{1,n^*}^H \begin{bmatrix} g2(1)q(i(1)) \\ g2(2)q(i(2)) \end{bmatrix} \text{ and } \rho_2 = \phi_{2,m^*}^H \begin{bmatrix} g2(3)q(i(3)) \\ g2(4)q(i(4)) \end{bmatrix};$$

defining the inter-subvector phase index by $$r^* = \text{argmax}_{r=0,1,\ldots P_3-1} |\rho_1 + \omega_r \rho_2|; \text{ and}$$

defining the optimal inter-subvector phase by $\omega_{r^*}$.

14. A non-transitory computer readable medium comprising software instructions, that when executed, are configured to perform a wireless communication method in a mobile terminal for supporting precoding matrix feedback for multi-user and single-user multiple-input and multiple-output (MIMO) systems, the wireless communication method comprising:
obtaining, at the mobile terminal, channel state information comprising at least gain information and relative-phase information;
generating precoding matrices comprising $b_g$, p1, p2, and p3 bit groups, wherein at least one of the precoding matrices is generated by quantization using at least the gain information and the relative-phase information;

selecting the best precoding matrix among the generated precoding matrices; and transmitting the bit sequence representing the selected precoding matrix to a base station.

15. The non-transitory computer readable medium of claim 14, wherein quantization in the mobile terminal comprises:

selecting permutation and gain information by defining $b_g$ feedback bits specifying an index into a joint permutation-gain codebook;

dividing the target vector into two sub-vectors based on the permutation;

selecting intra-subvector phase information for sub-vector 1 by defining p1 bits describing $\theta_1$;

selecting intra-subvector phase information for sub-vector 2 by defining p2 bits describing $\theta_2$;

selecting inter-subvector phase by defining p3 bits describing $\theta_3$; and grouping $b_g$, p1, p2, and p3 bits of information into bit sequence representing the selected precoding matrix for transmission to the base station.

16. The non-transitory computer readable medium of claim 15, wherein selecting permutation and gain information further comprises:

selecting, when using a 2-bit codebook, the antenna with the largest gain; and selecting, when using a 3-bit codebook or a 4-bit codebook, the two antennas with the largest gain and select the best of those two, wherein, when the gains are equal, consider the permutation with an unequal gain vector and calculate permutation-gain index (gaininnerp) according to the following equation: gaininnerp=$\Sigma_{k=1}^{4}$g(k)h(i(k)) for both the permutation/gain combination and for the equal gain vector, and select the antenna that provides the best permutation-gain index, wherein selecting intra-subvector phase information for sub-vector 1 further comprises:

defining an optimal index when g(1)=g(2) by $n^* = \text{argmax}_{n=0,1,\ldots,P_1-1} |\phi_{1,n}^H q1|;$ defining an optimal vector as $\phi_{1,n^*}$; and defining the optimal index, where g(1) is not equal to g(2), by $n^* = \text{argmax}_{n=0,1,\ldots,P_1-1} |\phi_{1,n}^H r1|$ where $r1 = \begin{bmatrix} g(1)q(i(1)) \\ g(2)q(i(2)) \end{bmatrix}$, wherein selecting intra-subvector phase information for sub-vector 2 further comprises:

defining an optimal index for cases where g(3)=g(4) by $m^* = \text{argmax}_{m=0,1,\ldots,P_2-1} |\phi_{2,m}^H q2|;$ defining an optimal vector by $\phi_{2,m^*}$; and defining the optimal index for cases where g(3) is not equal to g(4) by $m^* = \text{argmax}_{m=0,1,\ldots,P_2-1} |\phi_{2,m}^H r2|$ where $r2 = \begin{bmatrix} g(3)q(i(3)) \\ g(4)q(i(4)) \end{bmatrix}$, and wherein selecting inter-subvector phase further comprises:

selecting the inter-subvector phase between q1 and q2 given the intra-subvector phase selections;

defining $\rho_1 = \phi_{1,n^*}^H \begin{bmatrix} g(1)q(i(1)) \\ g(2)q(i(2)) \end{bmatrix}$ and $\rho_2 = \phi_{2,m^*}^H \begin{bmatrix} g(3)q(i(3)) \\ g(4)q(i(4)) \end{bmatrix}$;

defining the inter-subvector phase index by $r^* = \text{argmax}_{r=0,1,\ldots,P_3-1} |\rho_1 + \omega_r \rho_2|$; and defining the optimal inter-subvector phase by $\omega_{r^*}$.

17. The non-transitory computer readable medium of claim 14, wherein quantization in the mobile terminal using adaptive bit-allocation and phase components comprises:

selecting permutation and gain information by defining $b_g$ feedback bits specifying an index into the joint permutation-gain codebook;

dividing the target vector into two sub-vectors based on permutation;

deriving the bit-allocation {p1, p2, p3} to phase components from index into joint permutation-gain codebook;

selecting, given p1, intra-subvector phase information for sub-vector 1 by defining p1 bits describing $\theta_1$;

selecting, given p2, intra-subvector phase information for sub-vector 2 by defining p2 bits describing $\theta_2$;

selecting, given p3, inter-subvector phase by defining p3 bits describing $\theta_3$; and grouping $b_g$, p1, p2, and p3 bits of information into the bit sequence representing precoding matrix for transmission to the base station.

18. The non-transitory computer readable medium of claim 17, wherein selecting permutation and gain information further comprises:

selecting, when using a 2-bit codebook, the antenna with the largest gain when using a 2-bit codebook; and selecting, when using a 3-bit codebook or a 4-bit codebook, the two antennas with the largest gain and select the best of those two, wherein, when the gains are equal, consider the permutation with an unequal gain vector and calculate permutation-gain index (gaininnerp) according to the following equation: gaininnerp=$\Sigma_{k=1}^{4}$g(k)h(i(k)) for both the permutation/gain combination and for the equal gain vector, and select the antenna that provides the best permutation-gain index, wherein deriving the bit-allocation {p1, p2, p3} to phase components further comprises:

calculating $dB_{diff}$=log(∥[g2(1),g2(2)]∥/∥[g2(3),g2(4)]∥), wherein the rounded integer value of $dB_{diff}$ defines the bit-allocation to p1, p2 and p3, wherein selecting, given p1, intra-subvector phase information for sub-vector 1 further comprises:

defining, for cases where g2(1)=g2(2), the optimal index by $n^* = \text{argmax}_{n=0,1,\ldots,P_1-1} |\phi_{1,n}^H q1|;$ defining the optimal vector by $\phi_{1,n^*}$; and defining, for cases where g2(1) is not equal to g2(2), the optimal index by $n^* = \text{argmax}_{n=0,1,\ldots,P_1-1} |\phi_{1,n}^H r1|$ where $r1 = \begin{bmatrix} g2(1)q(i(1)) \\ g2(2)q(i(2)) \end{bmatrix}$, wherein selecting, given p2, intra-subvector phase information for sub-vector 2 further comprises:

defining, for cases where g2(3)=g2(4), the optimal index by $m^* = \text{argmax}_{m=0,1,\ldots,P_2-1} |\phi_{2,m}^H q2|;$ defining the optimal vector by $\phi_{2,m^*}$; and
defining, for cases where g2(3) is not equal to g2(4), the optimal index by $$m^* = \mathrm{argmax}_{m=0,1,\ldots,P_2-1} |\phi_{2,m}^H r2| \text{ where } r2 = \begin{bmatrix} g2(3)q(i(3)) \\ g2(4)q(i(4)) \end{bmatrix},$$

and
wherein selecting, given p3, inter-subvector phase further comprises:
defining $$\rho_1 = \phi_{1,n^*}^H \begin{bmatrix} g2(1)q(i(1)) \\ g2(2)q(i(2)) \end{bmatrix} \text{ and } \rho_2 = \phi_{2,m^*}^H \begin{bmatrix} g2(3)q(i(3)) \\ g2(4)q(i(4)) \end{bmatrix};$$

defining the inter-subvector phase index by $$r^* = \mathrm{argmax}_{r=0,1,\ldots P_3-1} |\rho_1 + \omega_r \rho_2|; \text{ and}$$

defining the optimal inter-subvector phase by $\omega_{r^*}$.

19. A mobile terminal for supporting precoding matrix feedback for multi-user and single-user multiple-input and multiple-output (MIMO) systems, the mobile terminal comprising:
- a structured codebook to select a precoding matrix, wherein the structured codebook comprises:
  a joint gain and permutation codebook;
  an intra-subvector phase codebook; and
  an inter-subvector phase codebook;
- a receiver, wherein the receiver of the mobile terminal receives channel state information (CSI) comprising at least gain information and relative-phase information;
- a generating unit, wherein the generating unit of the mobile terminal generates a bit sequence representing bit-allocation of each of the joint gain and permutation codebook, the intra-subvector phase codebook and the inter-subvector phase codebook for the optimal precoding matrix, by using at least the gain information and the relative-phase information between antenna elements; and
- a transmitter, wherein the transmitter of the mobile terminal transmits at least the bit sequence to a base station.

* * * * *